UNITED STATES PATENT OFFICE.

HENRY TILDEN, OF KELLOGG, IOWA.

IMPROVEMENT IN PREPARATION OF CORN FOR FOOD.

Specification forming part of Letters Patent No. 217,171, dated July 1, 1879; application filed February 1, 1879.

*To all whom it may concern:*

Be it known that I, HENRY TILDEN, of Kellogg, Jasper county, Iowa, have invented a new and useful Improvement in the Preparation of Corn for Food, of which the following is a clear, full, and exact description.

My invention has relation to the preserving of green corn as an article of food; and it consists in the manner of treatment hereinafter described and claimed.

Heretofore green corn prepared for the market has been prepared by the process of canning, in which the hull of the grain remains on the kernel, and, when eaten, the hull or bran has to be eaten with the corn.

It is a well-known fact that while the hull of the grain is indigestible, it also renders the grain less susceptible to moisture when applied to the corn to restore it to its normal condition. The removal of the hull overcomes this difficulty and puts the grain in a far better condition as an article of food.

By my process of preserving the green corn, the grain is first cut from the cob, then dried, and afterward is subjected to the hulling process in any suitable hulling-machine, the grinding-surfaces being kept just near enough to crack only a portion of the dried grains, the uncracked grains being separated and again returned to the mill with other grains to be treated. The breaking of the grain and the consequent friction liberate the bran or hull, and the hull is easily separated by the fan.

This uncooked, dried, and hulled corn I have had thoroughly tested as an article of food, and it is found to be altogether superior to canned corn, and can be supplied to the market at about one-fourth the price of the canned article, and at about one-half the price of the cost of cans themselves.

Having thus explained my invention, what I claim as new, and desire to secure by Letters Patent, is—

As an improved article of food, uncooked green corn, dried and hulled, substantially as and for the purpose set forth.

HENRY TILDEN.

Witnesses:
  L. D. FULLER,
  J. F. HACKETT.